(12) United States Patent
Kim

(10) Patent No.: US 8,589,958 B2
(45) Date of Patent: Nov. 19, 2013

(54) DISC DRIVE WITH LOCK RELEASE UNIT

(75) Inventor: Hag-Ryeol Kim, Yongin-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/441,073

(22) Filed: Apr. 6, 2012

(65) Prior Publication Data

US 2012/0260269 A1     Oct. 11, 2012

(30) Foreign Application Priority Data

Apr. 8, 2011   (KR) .................. 10-2011-0032815

(51) Int. Cl.
*G11B 17/04* (2006.01)

(52) U.S. Cl.
USPC ........................................... 720/610

(58) Field of Classification Search
USPC ......... 720/610, 613, 657, 607, 611, 612, 650, 720/608
See application file for complete search history.

(56) References Cited

U.S. PATENT DOCUMENTS

| | | | | |
|---|---|---|---|---|
| 5,844,873 A * | 12/1998 | Aoyama et al. | ............... | 720/676 |
| 7,123,438 B2 * | 10/2006 | Seo | ............... | 360/99.2 |
| 2006/0161931 A1 * | 7/2006 | Chen et al. | ............... | 720/610 |
| 2007/0028250 A1 * | 2/2007 | Chien et al. | ............... | 720/610 |
| 2010/0262980 A1 * | 10/2010 | Matsumoto et al. | ............ | 720/610 |
| 2012/0174133 A1 * | 7/2012 | Kim et al. | ............... | 720/610 |
| 2012/0174134 A1 * | 7/2012 | Kim et al. | ............... | 720/610 |
| 2012/0260270 A1 * | 10/2012 | Kim | ............... | 720/610 |
| 2012/0260271 A1 * | 10/2012 | Kim | ............... | 720/613 |

FOREIGN PATENT DOCUMENTS

| | | |
|---|---|---|
| JP | 10-269666 | 10/1998 |
| JP | 2001-006184 | 1/2001 |
| JP | 2001-118308 | 4/2001 |
| KR | 1995-0006834 | 7/1992 |

OTHER PUBLICATIONS

Korean Office Action issued Oct. 11, 2012 in counterpart Korean Patent Application No. 10-2011-0032815 (4 pages, in Korean).

* cited by examiner

*Primary Examiner* — Allen T Cao
(74) *Attorney, Agent, or Firm* — NSIP Law

(57) ABSTRACT

Provided is a disc drive including a tray which receives a disc thereon, slides into and out of a main chassis, and includes a pickup transporting unit which linearly moves a pickup base in a radial direction of the disc. The disc drive also includes a lock release unit which is driven by the pickup transporting unit to release locking of the tray from the main chassis, and includes a lock lever unit which includes a supporting hole for rotating the lock lever unit, and a hook unit to be combined with a locking protrusion arranged at the main chassis.

18 Claims, 6 Drawing Sheets

DISC DRIVE WITH LOCK RELEASE UNIT

CROSS-REFERENCE TO RELATED PATENT APPLICATION(S)

This application claims the benefit under 35 USC §119(a) of Korean Patent Application No. 10-2011-0032815, filed on Apr. 8, 2011, in the Korean Intellectual Property Office, the entire disclosure of which is incorporated herein by reference for all purposes.

BACKGROUND

1. Field

The following description relates to a disc drive, and more particularly, to a disc drive including a lock release unit.

2. Description of the Related Art

A disc drive is a device for writing and reading data to and from an optical recording medium, for example, a compact disc (CD), a digital video disc (DVD), and the like, by irradiating light thereto.

A disc drive typically includes a main chassis, a tray for receiving a disc thereon and which slides into and out of the main chassis, a cover which forms the outer case of the disc drive and protects internal components and electronic devices thereof, a spindle motor for rotating a disc loaded on the tray, an optical pickup unit for reproducing/writing data from and to a disc, and a pickup transporting unit which moves an optical pickup base mounted thereon across along a radial direction of a disc.

The disc drive also typically includes a locking unit for locking the tray into the main chassis and a lock release unit for releasing the tray from the main chassis.

In the related art, a lock release unit releases locking of a tray from a main chassis using a solenoid. However, because the solenoid is separately installed from the lock release unit, an additional space is required, and thus, the manufacturing costs increase.

Furthermore, a bushing is typically caulked in a supporting hole that is formed in a component of the tray in order to rotate with the tray. As a result, the overall manufacturing cost of the disc drive increases due to an increased number of parts.

SUMMARY

In one general aspect, there is provided a disc drive including a tray which receives a disc thereon, slides into and out of a main chassis, and comprises a pickup transporting unit which linearly moves a pickup base in a radial direction of the disc, and a lock release unit which is driven by the pickup transporting unit to release locking of the tray from the main chassis, and includes a lock lever unit which includes a supporting hole for rotating the lock lever unit, and a hook unit to be combined with a locking protrusion arranged at the main chassis.

The lock lever unit may comprise a body, the supporting hole into which a rotation shaft arranged at the tray is inserted for rotating the lock lever unit, wherein the supporting hole is formed by a burring process onto the body, and the hook unit which extends a predetermined length from the body and is to be combined with the locking protrusion.

The supporting hole may protrude from the rear surface of the body to a predetermined height.

The lock release unit may comprise a link unit which is rotatably installed on the tray and comprises a power transmitting unit which receives rotational force when combined with the pickup transporting unit, a connecting unit which is rotatably installed on the tray, which is connected to the lock lever unit and the link unit, and which rotates the lock lever unit via a rotational force of the link unit, and a spring which is fixed to the lock lever unit and the connecting unit and applies an elastic force in the direction in which the hook unit is combined with the locking protrusion.

The lock lever unit may comprise a rotational force receiving unit which contacts the connecting unit and receives a rotational force, and a spring fixing unit to which a first end of the spring is fixed.

The link unit may further comprise an interrupter which interrupts the feed guide from connecting the pickup base to the pickup transporting unit, and when the link unit rotates as the interrupter collides with the feed guide, the power transmitting unit may be combined with the pickup transporting unit.

The power transmitting unit may be formed as a protrusion having a predetermined height which is to be combined with a lead screw of the pickup transporting unit.

The disc drive may further comprise a pickup base position limiting unit which limits a position of the pickup base when the power transmitting unit is combined with the lead screw.

In another aspect, there is provided a disc drive including a tray which receives a disc thereon, slides into and out of the main chassis, and comprises a pickup transporting unit which linearly moves a pickup base in a radial direction of the disc, a lock release unit which is driven by the pickup transporting unit to release locking of the tray from the main chassis, and includes a lock lever unit, which includes a supporting hole formed for rotating the lock lever unit, and a hook unit to be combined with a locking protrusion arranged at the main chassis, a link unit which is rotatably installed on the tray and comprises a power transmitting unit which receives a rotational force by being combined with the pickup transporting unit, a connecting unit which is rotatably installed on the tray, is connected to the lock lever unit and the link unit, and rotates the lock lever unit via a rotational force of the link unit, and a spring which is fixed to the lock lever unit and the connecting unit and applies an elastic force in the direction in which the hook unit is combined with the locking protrusion.

The lock lever unit may comprise a body, the supporting hole into which a rotation shaft arranged at the tray is inserted for rotating the lock lever unit, wherein the supporting hole is formed by a burring process onto the body, and the hook unit which extends a predetermined length from the body and is to be combined with the locking protrusion.

The supporting hole may protrude from the rear surface of the body to a predetermined height.

The lock lever unit may comprise a rotational force receiving unit which contacts the connecting unit and receives a rotational force, and a spring fixing unit to which a first end of the spring is fixed.

The link unit may further comprise an interrupter which interrupts the feed guide from connecting the pickup base to the pickup transporting unit, and when the link unit rotates as the interrupter collides with the feed guide, the power transmitting unit may be combined with the pickup transporting unit.

The power transmitting unit may be formed as a protrusion having a predetermined height which is to be combined with a lead screw of the pickup transporting unit.

The disc drive may further comprise a pickup base position limiting unit which limits a position of the pickup base when the power transmitting unit is combined with the lead screw.

Other features and aspects may be apparent from the following detailed description, the drawings, and the claims.

Figure 1:
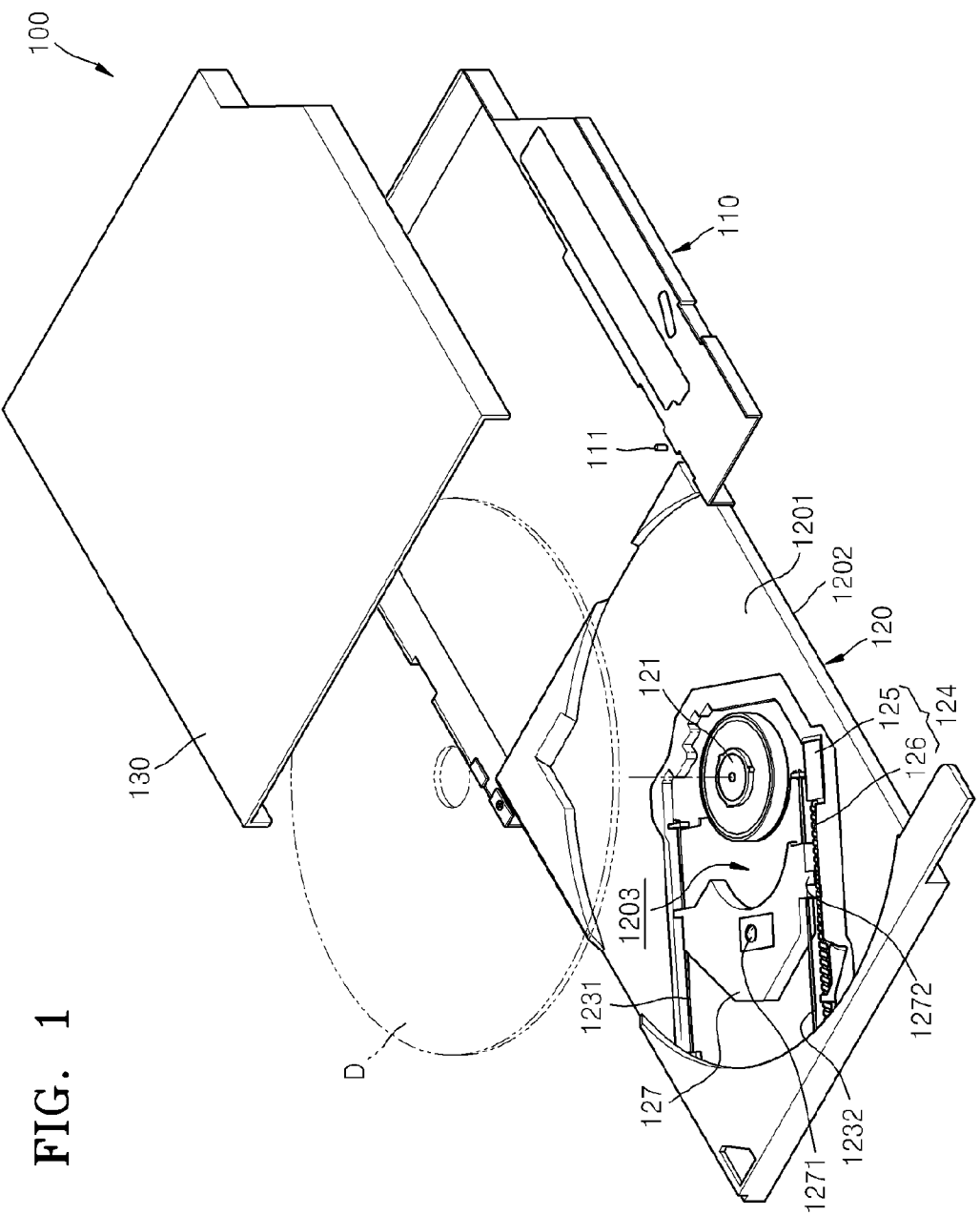
FIG. 1 is a diagram illustrating an example of a disc drive including a lock release unit.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
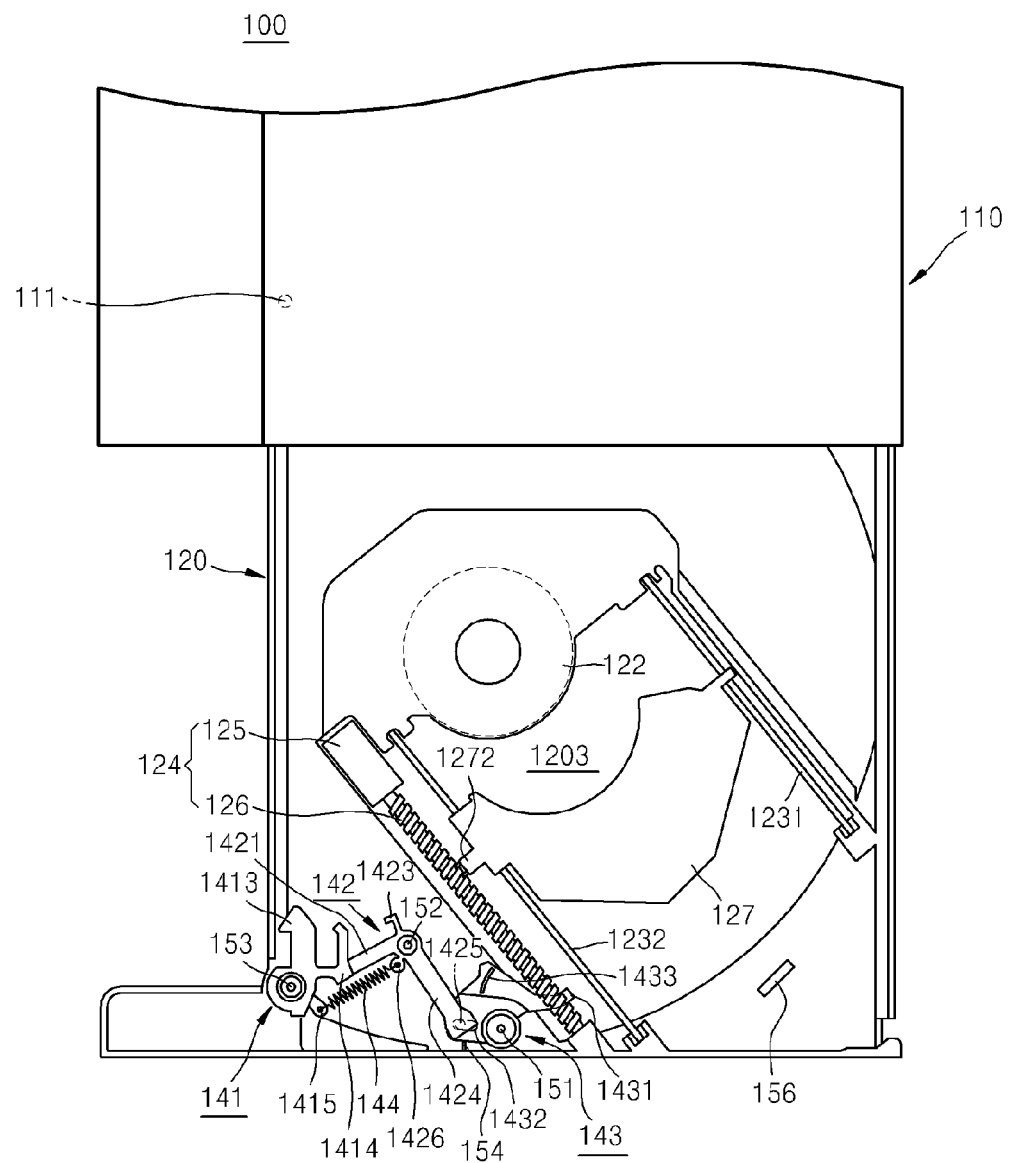
FIG. 2 is a diagram illustrating an example of a rear perspective view of the disc drive of FIG. 1.
Figure 3:
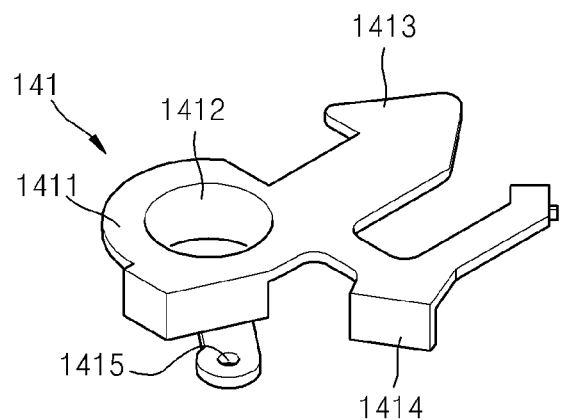
FIG. 3 is a diagram illustrating an example of a lock lever unit of a lock release unit shown in FIG. 2.
Figure 4:
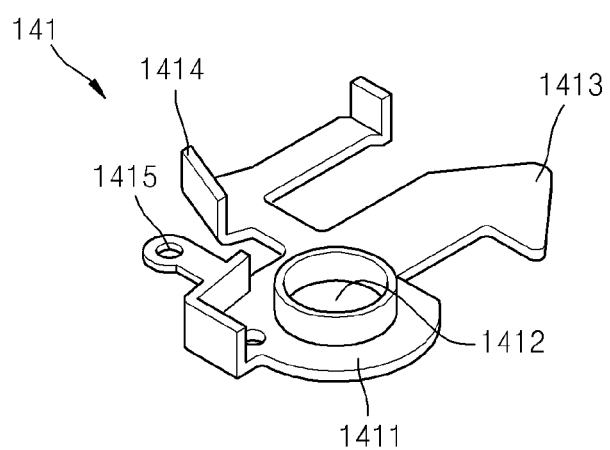
FIG. 4 is a diagram illustrating an example of a rear perspective view of the lock lever unit of FIG. 3.
Figure 5:
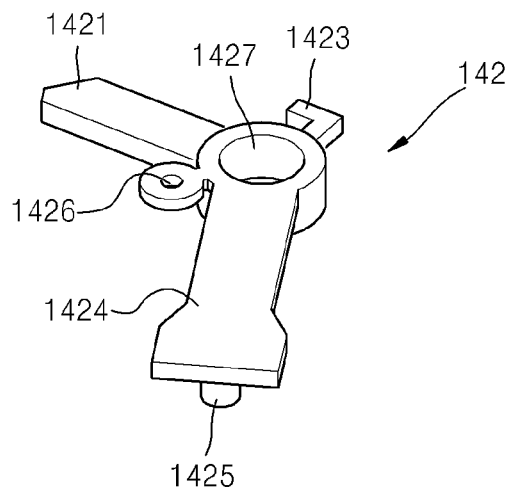
FIG. 5 is a diagram illustrating an example of a connecting unit of the lock release unit of FIG. 2.
Figure 6:
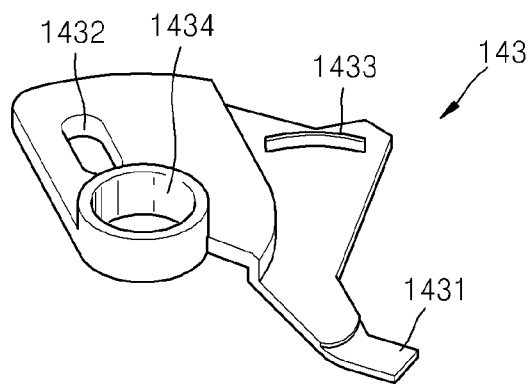
FIG. 6 is a diagram illustrating an example of a link unit of the lock release unit of FIG. 2.

FIG. 1 illustrates an example of a disc drive 100 including a lock release unit. FIG. 2 illustrates an example of a rear perspective view of the disc drive of FIG. 1. FIG. 3 illustrates an example of a lock lever unit of a lock release unit shown in FIG. 2. FIG. 4 illustrates an example of a rear perspective view of the lock lever unit of FIG. 3. FIG. 5 illustrates an example of a connecting unit of the lock release unit of FIG. 2. FIG. 6 illustrates an example of a link unit of the lock release unit of FIG. 2.

Referring to FIGS. 1 through 6, the disc drive 100 includes a main chassis 110, a cover 130 which covers the main chassis 110 such that a predetermined space is formed between the cover 130 and the main chassis 110, and a tray 120 which may receive a disc D thereon and is slidably installed to the main chassis 110 to slide into and out of the main chassis 110.

A turntable 121 on which the disc D may be mounted, a driving motor 122 for rotating the turntable 121, and an optical pickup unit 1271 which writes data to and reads data from the disc D while the disc is arranged on the tray 120.

In this example, the optical pickup unit 1271 is installed at a pickup base 127, and the pickup base 127 is attached to two guide shafts 1231 and 1232 which guide the pickup base 127 to linearly move in a radial direction along the disc D. A lead screw 126 for linearly moving the pickup base 127 in a radial direction of the disc D and a step motor 125 for rotating the lead screw 126 are arranged as a pickup transporting unit 124, and a feed guide 1272 for transmitting a rotational force of the lead screw 126 to the pickup base 127 is installed at the pickup base 127. A space portion 1203 in which the pickup base 127 linearly reciprocates is formed near a center portion of a body of the tray 120.

A lock release unit releases the locking of the tray 120 inserted and locked into the main chassis 110. The lock release unit includes a lock lever unit 141, a connecting unit 142, and a link unit 143, which are installed on the rear surface 1202 of the tray 120. The lock release unit is arranged close to the lead screw 126 and is interlocked with the lead screw 126 to release locking of the tray 120.

As shown in FIGS. 3 and 4, the lock lever unit 141 locks or releases the tray 120 in the main chassis 110. The lock lever unit 141 includes a body 1411, a supporting hole 1412 which penetrates the body 1411, and a hook unit 1413 which extends a predetermined length from the body 1411 and combines with a locking protrusion 111 formed on the rear surface of the main chassis 110. The lock lever unit 141 also includes a rotational force receiving unit (1414 of FIG. 3) which is connected to the hook unit 1413 and receives a rotational force by contacting the connecting unit (142 of FIG. 2), and a spring fixing unit 1415 to which a first end of a spring 144 is fixed. The supporting hole 1412 may be formed by performing a burring process with respect to the body 1411 and may protrude from the rear surface of the body 1411 by a predetermined height. A rotation shaft or rotary shaft (153 of FIG. 2) arranged on the rear surface 1202 of the tray is inserted in the supporting hole 1412 for rotating the lock lever unit 141. The supporting hole 1412, the hook unit 1413, the rotational force receiving unit 1414, and the spring fixing unit 1415 may be integrally formed with the body 1411. Therefore, by forming the supporting hole 1412 in the lock lever unit 141 via a burring process, the number of parts and manufacturing cost may be reduced. For example, the burring process may use a cylindrical press-punch for widening a hole formed in advance in a target object.

Although a burring process is described as an example for forming the supporting hole 1412, the following description is not limited thereto. Also, other burring processes may be performed with regard to holes 1434 and 1427 formed in the link unit 143 and the connecting unit 142.

The link unit 143 is a unit via which a rotational force is transmitted. The link unit 143 includes a hole 1434 (shown in FIG. 6) into which the rotation shaft 151 arranged on the rear surface 1202 of the tray 120 is inserted for rotating the lock lever unit 141, a connecting hole 1432 which is formed for connecting the connecting unit 142 to the link unit 143, a power transmitting unit 1433 which is a protrusion formed to a predetermined height to be selectively combined with the lead screw 126, and an interrupter 1431 which extends to a predetermined length to selectively collide with the feed guide 1272. In this example, the power transmitting unit 1433 and the interrupter 1431 are formed to face the lead screw 126.

The connecting unit 142 rotates by receiving a rotational force of the link unit 143 and rotates the lock lever unit 141. The connecting unit 142 includes a hole 1427 into which a rotation shaft 152 arranged on the rear surface 1202 of a body 1201 of the tray 120 may be inserted for rotating the connecting unit 142, a first connecting unit 1424 which includes a connecting protrusion 1425 that is inserted into the connecting hole 1432 of the link unit 143, a second connecting unit 1421 which is connected to the rotational force receiving unit 1414 of the lock lever unit 141, a spring fixing unit 1426 to which a second end of the spring 144 is fixed, and a position limiting unit 1423 for limiting an initial position of the lock release unit 140.

In this example, a stopper 154 is arranged close to the link unit 143 to limit the initial position of the lock release unit 140, and is arranged on the rear surface 1202 of the tray 120. As shown in FIG. 2, if the tray 120 is moved out of the main chassis 110, the lock release unit 140 is at the initial position at which the tray 120 is released from the main chassis 110. At this point, the link unit 143 contacts the stopper 154, and the position limiting unit 1423 of the connecting unit 142 contacts a frame 155 (shown in FIG. 8) of the tray 120. In this example, the initial position of the lock release unit 140 is limited by the stopper 154 and the position limiting unit 1423.

A pickup base position limiting unit 156 limits the initial position of the tray 120 and is arranged on the rear surface 1202 of the tray 120. For example, the outward movement of the pickup base 127 may be limited by the pickup base position limiting unit 156.

An elastic force may be applied to the lock lever unit 141 by the spring 144 in a direction in which the hook unit 1413 is combined with the locking protrusion 111.

Figure 7:
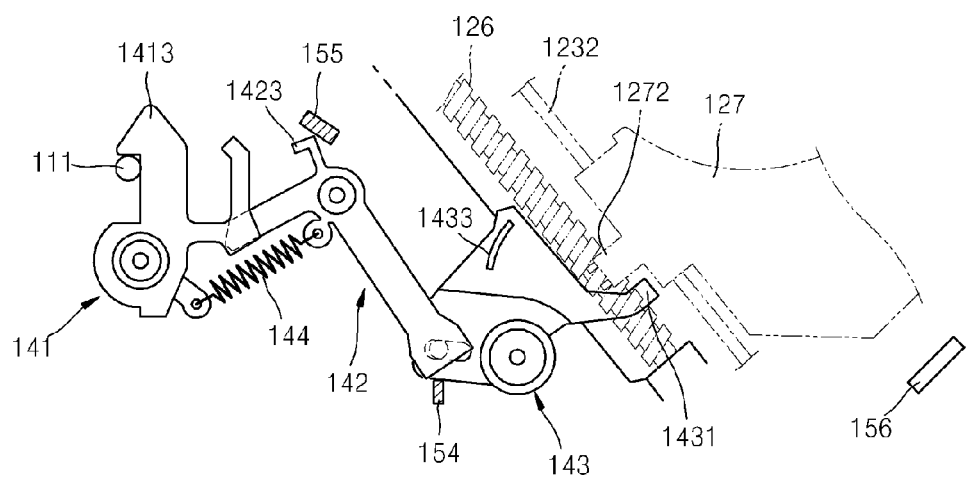
FIGS. 7 through 9 are diagrams illustrating examples of a series of operations of the lock release unit shown in FIG. 2.
Figure 8:
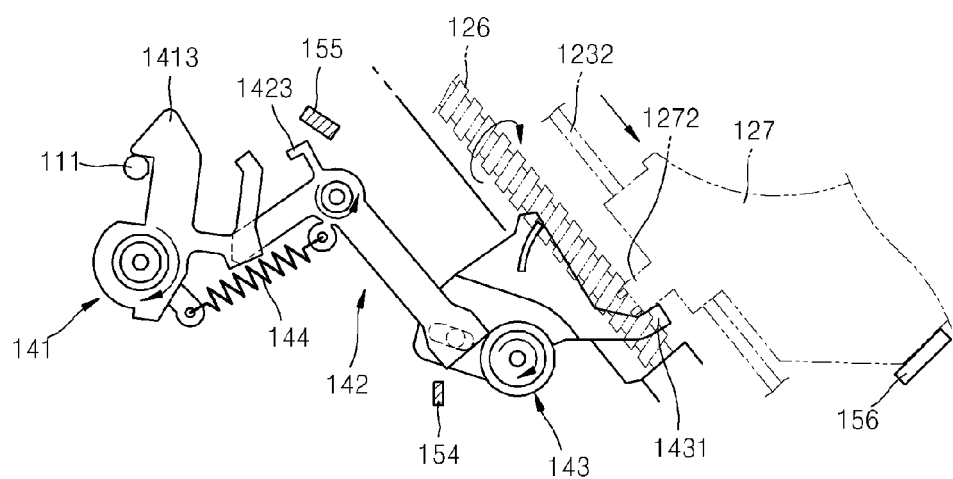
Figure 9:
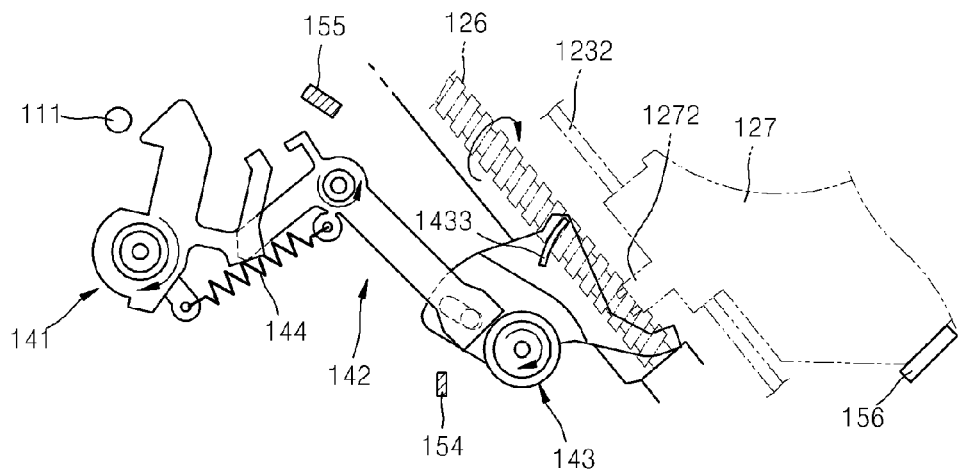

FIGS. 7 through 9 illustrate examples of a series of operations of the lock release unit shown in FIG. 2.

Referring to FIG. 7, the tray (120 of FIG. 2) is inserted into the main chassis (110 of FIG. 2) and the hook unit 1413 is combined with the locking protrusion 111. This state corresponds to an initial state of the lock release unit 140. In this example, the link unit 143 contacts the stopper 154, the position limiting unit 1423 contacts the frame 155, and the spring 144 applies an elastic force to the lock lever unit 141 in a counterclockwise direction. Therefore, the lock lever unit 141 is prevented from rotating in the clockwise direction, and thus, the hook unit 1413 may remain secured with the locking protrusion 111. As a result, the tray (120 of FIG. 2) may be securely maintained in the main chassis (110 of FIG. 2).

At this point, the power transmitting unit 1433 does not contact the lead screw 126, and the interrupter 1431 does not contact the feed guide 1272 of the pickup base 127. The pickup base 127 receives a rotational force of the lead screw 126 from the feed guide 1272 and may read out data recorded on a disc and write data to the disc while linearly moving back and forth along a radial direction of the disc. It should be appreciated that a position of the pickup base 127 may vary and is not limited to the position shown in FIG. 4. However, while the optical pickup unit (1271 of FIG. 1) is writing data or reading out data, the feed guide 1272 of the pickup base 127 may not contact the interrupter 1431. In other words, even if the optical pickup unit 1271 is positioned at the outermost position of a disc, the feed guide 1272 of the pickup base 127 may not contact the interrupter 1431.

Referring to FIG. 8, in response to a lock release signal being input, a control unit (not shown) drives the step motor (125 of FIG. 2) to rotate the lead screw 126 in the clockwise direction. As a result, the pickup base 127 is moved by the lead screw 126 in the direction indicated by the arrow. As the interrupter 1431 contacts the feed guide 1272, the link unit 143 rotates in the clockwise direction, and thus, the connecting unit 142 connected to the link unit 143 rotates in the counterclockwise direction and the lock lever unit 141 connected to the connecting unit 142 rotates in the clockwise direction. As a result, the link unit 143 is detached from the stopper 154, and the position limiting unit 1423 is detached from the frame 155. Furthermore, as the link unit 143 rotates, the power transmitting unit 1433 is combined with the lead screw 126. As a result, the pickup base 127 collides with the pickup base position limiting unit 156 formed on the rear surface 1202 of the tray (120 of FIG. 1) and a movement thereof is limited. In other words, as the pickup base 127 collides with the pickup base position limiting unit 156 and becomes unable to move further, the power transmitting unit 1433 is combined with the lead screw 126.

The rotation of the link unit 143 due to the movement of the pickup base 127 before the pickup base 127 collides with the pickup base position limiting unit 156 may be insufficient for detaching the hook unit 1413 from the locking protrusion 111. Therefore, the hook unit 1413 is maintained in combination with the locking protrusion 111. In this example, until the pickup base 127 collides with the pickup base position limiting unit 156, the movement of the pickup base 127 serves to combine the power transmitting unit 1433 to the lead screw 126 and may not serve to detach the hook unit 1413 from the locking protrusion 111.

If an external shock is applied to the disc drive (100 of FIGS. 1 and 2), even if the pickup base 127 is arbitrarily moved, the pickup base 127 may be limited from being further moved from the state shown in FIG. 4. Therefore, even if an arbitrary external shock is applied to the disc drive (100 of FIGS. 1 and 2), the locking of the tray (120 of FIG. 1) is not released from the main chassis (110 of FIGS. 1 and 2).

Referring to FIG. 9, if the power transmitting unit 1433 is combined with the lead screw 126, the step motor (125 of FIG. 2) rotates further in the clockwise direction. At this point, because the pickup base 127 contacts the pickup base position limiting unit 156, a further movement of the pickup base 127 is limited. Furthermore, the feed guide 1272 is unable to move and is stopped due to the lead screw 126. Therefore, as the link unit 143 rotates in the clockwise direction, the interrupter 1431 is detached from the feed guide 1272.

Because a rotation of the link unit 143 is transmitted to the lock lever unit 141 via the connecting unit 142, the hook unit 1413 is detached from the locking protrusion 111. At this point, the spring 144 is extended to the maximum. Therefore, the tray 120 protrudes from the main chassis 110 (refer to FIG. 1).

Figure 10:
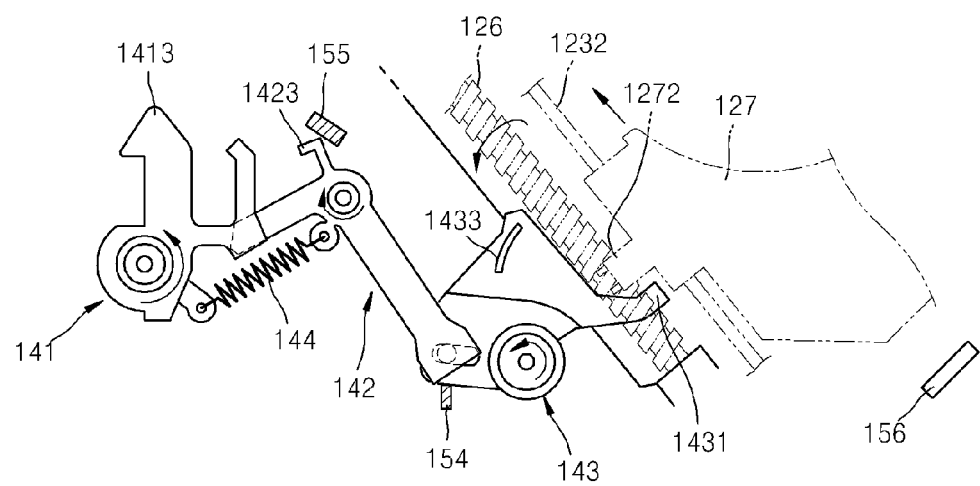
FIG. 10 is a diagram illustrating an example of returning of the lock release unit to an initial position.

FIG. 10 illustrates an example of the returning of the lock release unit 140 to the initial position.

FIG. 10 shows that the lock release unit 140 is returned to the initial position, and thus, the hook unit 1413 is combined with the locking protrusion (111 of FIG. 1) in response to the tray (120 of FIG. 1) being inserted back into the main chassis (110 of FIG. 1).

The control unit reversely rotates the step motor (125 of FIG. 2) in the counterclockwise direction. As a result, the lead screw 126 also reversely rotates, and the power transmitting unit 1433 is detached from the lead screw 126. Furthermore, because an extending force of the spring 144 is also applied, the link unit 143 rotates in the counterclockwise direction, the connecting unit 142 connected to the link unit 143 rotates in the clockwise direction, and the lock lever unit 141 connected to the connecting unit 142 rotates in the counterclockwise direction. Furthermore, the position limiting unit 1423 contacts the frame 155, and the link unit 143 contacts the stopper 154. This state is the initial position of the lock release unit 140 shown in FIG. 6. On the other hand, as a rotational force of the lead screw 126 is transmitted to the pickup base 127 via the feed guide 1272, the pickup base 127 is moved in the direction indicated by the arrow and is detached from the pickup base position limiting unit 156.

While the following description has been particularly shown and described with reference to exemplary embodiments thereof, it will be understood by those of ordinary skill in the art that various changes in form and details may be made therein without departing from the spirit and scope of the present invention as defined by the following claims.

A disc as described herein may include one or more program instructions, or one or more operations thereof, which may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disc drive comprising:
   a tray which receives a disc thereon, slides into and out of a main chassis, and comprises a pickup transporting unit which linearly moves a pickup base in a radial direction of the disc; and
   a lock release unit which is driven by the pickup transporting unit to release locking of the tray from the main chassis, and includes a lock lever unit which comprises:
      a body;
      a supporting hole, into which a rotation shaft arranged at the tray is inserted, for rotating the lock lever unit; and
      a hook unit to be combined with a locking protrusion arranged at the main chassis.

2. The disc drive of claim 1, wherein
   the supporting hole is formed by a burring process onto the body; and
   the hook unit extends a predetermined length from the body and is to be combined with the locking protrusion.

3. The disc drive of claim 2, wherein the supporting hole protrudes from the rear surface of the body to a predetermined height.

4. The disc drive of claim 3, wherein the lock release unit comprises:
   a link unit which is rotatably installed on the tray and comprises a power transmitting unit which receives rotational force when combined with the pickup transporting unit;
   a connecting unit which is rotatably installed on the tray, which is connected to the lock lever unit and the link unit, and which rotates the lock lever unit via a rotational force of the link unit; and
   a spring which is fixed to the lock lever unit and the connecting unit and applies an elastic force in the direction in which the hook unit is combined with the locking protrusion.

5. The disc drive of claim 4, wherein the lock lever unit comprises:
   a rotational force receiving unit which contacts the connecting unit and receives a rotational force; and
   a spring fixing unit to which a first end of the spring is fixed.

6. The disc drive of claim 4, wherein the link unit further comprises an interrupter which interrupts the feed guide from connecting the pickup base to the pickup transporting unit, and
   when the link unit rotates as the interrupter collides with the feed guide, the power transmitting unit is combined with the pickup transporting unit.

7. The disc drive of claim 4, wherein the power transmitting unit is formed as a protrusion having a predetermined height which is to be combined with a lead screw of the pickup transporting unit.

8. The disc drive of claim 7, further comprising a pickup base position limiting unit which limits a position of the pickup base when the power transmitting unit is combined with the lead screw.

9. The disc drive of claim 4, wherein the link unit further comprises an interrupter which interrupts the feed guide from connecting the pickup base to the pickup transporting unit, and
   when the link unit rotates as the interrupter collides with the feed guide, the power transmitting unit is combined with the pickup transporting unit.

10. The disc drive of claim 4, wherein the power transmitting unit is formed as a protrusion having a predetermined height which is to be combined with a lead screw of the pickup transporting unit.

11. The disc drive of claim 10, further comprising a pickup base position limiting unit which limits a position of the pickup base when the power transmitting unit is combined with the lead screw.

12. A disc drive comprising:
   a tray which receives a disc thereon, slides into and out of the main chassis, and comprises a pickup transporting unit which linearly moves a pickup base in a radial direction of the disc;
   a lock release unit which is driven by the pickup transporting unit to release locking of the tray from the main chassis, and includes a lock lever unit, which comprises:
      a supporting hole formed for rotating the lock lever unit; and
      a hook unit to be combined with a locking protrusion arranged at the main chassis;
   a link unit which is rotatably installed on the tray and comprises a power transmitting unit which receives a rotational force by being combined with the pickup transporting unit;
   a connecting unit which is rotatably installed on the tray, is connected to the lock lever unit and the link unit, and rotates the lock lever unit via a rotational force of the link unit; and a spring which is fixed to the lock lever unit and the connecting unit and applies an elastic force in the direction in which the hook unit is combined with the locking protrusion.

13. The disc drive of claim 12, wherein the lock lever unit comprises:

a body;

the supporting hole into which a rotation shaft arranged at the tray is inserted for rotating the lock lever unit, wherein the supporting hole is formed by a burring process onto the body; and the hook unit which extends a predetermined length from the body and is to be combined with the locking protrusion.

14. The disc drive of claim 13, wherein the supporting hole protrudes from the rear surface of the body to a predetermined height.

15. The disc drive of claim 12, wherein the lock lever unit comprises:

a rotational force receiving unit which contacts the connecting unit and receives a rotational force; and a spring fixing unit to which a first end of the spring is fixed.

16. A disc drive comprising:

a tray which receives a disc thereon, slides into and out of the main chassis, and comprises a pickup transporting unit which linearly moves a pickup base in a radial direction of the disc;

a lock release unit which is driven by the pickup transporting unit to release locking of the tray from the main chassis, and includes a lock lever unit, which comprises:

a supporting hole formed for rotating the lock lever unit; and a hook unit to be combined with a locking protrusion arranged at the main chassis; and a link unit which is rotatably installed on the tray and comprises a power transmitting unit which receives a rotational force by being combined with the pickup transporting unit.

17. The disc drive of claim 16, wherein the supporting hole protrudes from the rear surface of the body to a predetermined height.

18. The disc drive of claim 16, wherein the supporting hole receives a rotation shaft therein for rotating the lock lever unit.

* * * * *